United States Patent
McGaughey et al.

(10) Patent No.: US 8,549,910 B2
(45) Date of Patent: Oct. 8, 2013

(54) FUEL SYSTEM ELECTRO-STATIC POTENTIAL DIFFERENTIAL LEVEL SENSOR ELEMENT AND HARDWARE/SOFTWARE CONFIGURATION

(75) Inventors: Robert McGaughey, Bringhurst, IN (US); John Troxler, Logansport, IN (US)

(73) Assignee: Federal-Mogul Corporation, Southfield, MI (US)

(*) Notice: Subject to any disclaimer, the term of this patent is extended or adjusted under 35 U.S.C. 154(b) by 347 days.

(21) Appl. No.: 12/683,974

(22) Filed: Jan. 7, 2010

(65) Prior Publication Data
US 2011/0162448 A1  Jul. 7, 2011

(51) Int. Cl.
*G01F 23/26* (2006.01)

(52) U.S. Cl.
USPC ..... 73/304 C; 73/290 B; 73/290 R; 73/304 R (58) Field of Classification Search
USPC ............. 73/290 B, 290 R, 304 R, 304 C
See application file for complete search history.

(56) References Cited

U.S. PATENT DOCUMENTS

| | | | |
|---|---|---|---|
| 2,354,945 A * | 8/1944 | Cohen et al. ............... | 73/304 C |
| RE23,844 E * | 6/1954 | Condon .................... | 73/304 C |
| 2,703,857 A * | 3/1955 | Engelhardt et al. ......... | 361/323 |
| 2,752,543 A | 6/1956 | Smith | |
| 3,343,415 A | 9/1967 | Johnston | |
| 3,816,774 A * | 6/1974 | Ohnuki et al. ............. | 310/332 |
| 3,900,748 A * | 8/1975 | Adler ...................... | 310/333 |
| 3,958,159 A * | 5/1976 | Rauchwerger ............. | 361/284 |
| 4,335,608 A * | 6/1982 | Wood et al. ............... | 73/753 |
| 4,428,232 A | 1/1984 | Tanaka et al. | |
| 4,553,434 A * | 11/1985 | Spaargaren ................ | 73/304 C |
| 4,567,762 A * | 2/1986 | Hopper et al. ............. | 73/304 R |
| 4,618,268 A * | 10/1986 | Horner ..................... | 374/115 |
| 4,690,143 A * | 9/1987 | Schroeppel ................ | 607/5 |
| 4,891,980 A * | 1/1990 | Kawai et al. .............. | 73/290 R |
| 4,947,689 A | 8/1990 | Hochstein | |
| 4,984,222 A * | 1/1991 | Beauducel et al. ......... | 367/159 |
| 5,001,596 A | 3/1991 | Hart | |
| 5,001,927 A | 3/1991 | LaCava et al. | |
| 5,050,431 A | 9/1991 | McDonald | |
| 5,051,921 A | 9/1991 | Paglione | |
| 5,247,834 A * | 9/1993 | Woss ....................... | 73/453 |
| 5,423,214 A * | 6/1995 | Lee ......................... | 73/304 C |
| 5,437,184 A | 8/1995 | Shillady | |
| 5,526,601 A * | 6/1996 | Onuma et al. ............. | 43/17 |
| 5,726,908 A * | 3/1998 | Hosmer et al. ............ | 702/55 |
| 5,735,167 A | 4/1998 | Puukangas et al. | |
| 5,790,016 A | 8/1998 | Konchin et al. | |
| 6,335,690 B1 | 1/2002 | Konchin et al. | |

(Continued)

FOREIGN PATENT DOCUMENTS

WO  0043735  7/2000

*Primary Examiner* — David A Rogers
(74) *Attorney, Agent, or Firm* — Robert L. Stearns; Dickinson Wright, PLLC (57) ABSTRACT

A sensor assembly for sensing the level and type of fuel in a reservoir is provided. The sensor assembly includes a pair of electrically conductive plates extending longitudinally between opposite ends and positioned in laterally spaced relationship with respect to one another. The pair of plates are encapsulated within a substrate of a less electrically conductive material to isolate the plates from one another and from their external environment. The substrate is of a spring-like material which is expandable and contractible in order to vary the height of the sensor assembly.

12 Claims, 5 Drawing Sheets

(56) References Cited

U.S. PATENT DOCUMENTS

| | | | |
|---|---|---|---|
| 6,490,920 B1 * | 12/2002 | Netzer | 73/304 C |
| 6,588,253 B2 | 7/2003 | Lambert et al. | |
| 6,781,388 B2 | 8/2004 | Wang et al. | |
| 6,862,919 B2 | 3/2005 | Lin et al. | |
| 7,047,807 B2 * | 5/2006 | Woodard et al. | 73/304 C |
| 7,062,965 B2 | 6/2006 | Immel | |
| 7,069,795 B2 * | 7/2006 | McKevitt et al. | 73/862.637 |
| 7,127,943 B1 * | 10/2006 | Griffiths et al. | 73/304 C |
| 7,258,005 B2 | 8/2007 | Nyce | |
| 7,340,951 B2 | 3/2008 | Nyce et al. | |
| 7,600,423 B1 * | 10/2009 | Fluhler et al. | 73/290 B |
| 7,661,307 B1 * | 2/2010 | Milone | 73/304 R |
| 2001/0000851 A1 * | 5/2001 | Morimoto | 73/304 C |
| 2001/0037680 A1 * | 11/2001 | Buck et al. | 73/304 C |
| 2005/0229700 A1 * | 10/2005 | Chai et al. | 73/304 R |
| 2006/0156809 A1 | 7/2006 | Immel | |
| 2007/0240506 A1 | 10/2007 | Lin | |
| 2008/0134779 A1 | 6/2008 | Tung et al. | |
| 2008/0223128 A1 | 9/2008 | Nydenov | |
| 2009/0249871 A1 | 10/2009 | Massa et al. | |

* cited by examiner

FUEL SYSTEM ELECTRO-STATIC POTENTIAL DIFFERENTIAL LEVEL SENSOR ELEMENT AND HARDWARE/SOFTWARE CONFIGURATION

BACKGROUND OF THE INVENTION

1. Technical Field

This invention relates generally to a level sensor in a fuel system, and in particular, to an electro-static potential differential level sensor element for measuring fuel in a fuel system.

2. Related Art

Typical automotive fuel systems include an in-tank mounted fuel delivery system which includes a reservoir for containing fuel with the tank. A fuel pump located inside of the reservoir withdraws the fuel from the reservoir and delivers it to an internal combustion engine. As the fuel is withdrawn from the reservoir, a fuel detection device measures the level of fuel that remains in the tank by use of a sensor. Fluid level measuring mechanisms include, for example, floating arm mechanisms, pressure sensors, capacitive sensors and ultrasonic sensors.

Floating arm mechanisms require moving parts inside the reservoir, require time to install and are suspect to developing contact problems resulting in erroneous measurement. Typically a float is pivotally mounted to a fuel level assembly, which interacts with circuitry to develop a measurement of the level of fuel in the tank based on the buoyant position of the float.

Capacitive sensors use an electrical capacitor for measurement and another for reference. The capacitor used for measurement is normally present over the entire height of the tank, and the capacitance various varies according to the level of fuel in the tank. The reference capacitor is permanently immersed in the fuel and supplies a reference value of the dielectric constant of the fuel. An electronic circuit determines the level of the fuel in the tank. The capacitors can be flat or cylindrical plates between which fuel can fall and rise, thereby influencing the capacitance. These sensors may also be in the form of an interdigital electrode which interacts by interference effect.

U.S. Pat. No. 5,001,596 discloses a capacitor for a fluid level sensor that has elongated expandable capacitor plates mounted in spaced relationship with respect to one another to form a capacitor for measuring data representing liquid in a container. The capacitor plates are continuously expandable to accommodate any change in shape of the container.

U.S. Publication 2007/0240506 discloses a sensing assembly that senses the level of fluid in a reservoir. An excitation circuit is electrically connected to first and second ports for receiving voltage signals and to generate excitation signals. A receiving circuit is disposed adjacent to the excitation circuit and defines a variable capacitance with the excitation circuit. The receiving circuit produces an output voltage variable with the level of the fluid in a reservoir due to capacitance changes between the excitation circuit and receiving circuit due to dielectric changes created by the fluid.

SUMMARY OF THE INVENTION

This invention relates to a sensor element in a fuel system, and in particular, to an electro-static potential differential level sensor element for measuring fuel levels and fuel type in a fuel system. A sensor element includes two electrode plates mounted on a dielectric material and secured to a shield plate. The sensor element is extruded to form a three dimensional sensor element, such as a spiral coil, that has an increased capacitance detection ability to measure fuel type and level.

In one embodiment of the invention, there is a capacitive sensor element, including at least two elongated plates positioned in spaced relationship with respect to each other and attached to a dielectric material, and a capacitive element coupled to the at least two elongated plates such that a capacitance is formed, wherein the dielectric constant measured at the capacitive element changes in response to variances in a fluid and air dielectric, and the capacitive sensor element is configurable to expand and contract.

In one aspect of the invention, the at least two elongated plates are extruded to form a substantially spiral shape which is expandable and contractible in order to vary a height of the capacitive sensor element.

In another aspect of the invention, the at least two elongated plates are extruded onto a spring-like material to form a substantially helical shape which is expandable and contractible in order to vary a height of the capacitive sensor element.

In still another aspect of the invention, the at least two elongated plates are interlaced to create an expandable and contractible element.

In yet another aspect of the invention, the measured dielectric constant corresponds to a fluid level or fluid type.

In another aspect of the invention, the sensor element outputs a capacitance corresponding to the measured dielectric constant to an application-specific integrated circuit (ASIC) which converts the capacitance to a voltage, and the voltage is output to a microcontroller which changes a resistance level of output circuitry and displays results on a display.

In yet another aspect of the invention, the fluid is fuel for a vehicle, and the capacitive sensor is adaptable to expand and contract into varying shapes and sizes of a fuel tank which holds the fuel.

In another embodiment of the invention, there is a method of measuring fluid in a reservoir using a capacitive sensor element, including positioning at least two elongated plates in spaced relationship with respect to each other and attached to a dielectric material, and coupling a capacitive element to the at least two elongated plates such that a capacitance is formed, wherein the dielectric constant measured at the capacitive element changes in response to variances in the fluid and air dielectric, and the capacitive sensor element is configurable to expand and contract.

In one aspect of the invention, the method further includes extruding the at least two elongated plates to form a substantially spiral shape which is expandable and contractible in order to vary a height of the capacitive sensor element.

In another aspect of the invention, the method further includes extruding the at least two elongated plates onto a spring-like material to form a substantially helical shape which is expandable and contractible in order to vary a height of the capacitive sensor element.

In still another aspect of the invention, the method includes interlacing the at least two elongated plates to create an expandable and contractible element.

In yet another aspect of the invention, the measured dielectric constant corresponds to a fluid level or fluid type.

In another aspect of the invention, the method further includes outputting a capacitance corresponding to the measured dielectric constant to an application-specific integrated circuit (ASIC) which converts the capacitance to a voltage, and outputting the voltage is to a microcontroller which changes a resistance level of output circuitry and displays results on a display.

In yet another aspect of the invention, the fluid is fuel for a vehicle, and the capacitive sensor is adaptable to expand and contract into varying shapes and sizes of a fuel tank which holds the fuel.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
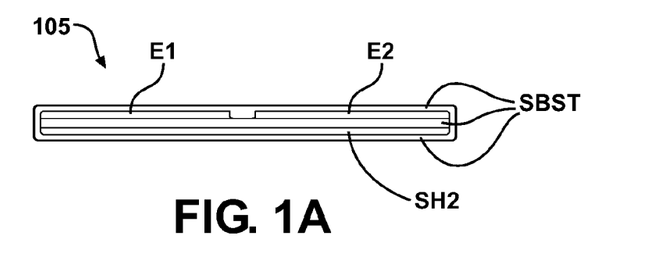
FIG. 1A shows a cross section of a sensor element in accordance with the invention.

FIG. 1A shows an exemplary sensor element 105 in accordance with one aspect of the present invention. The sensor element 105 described herein is used to measure the level of a liquid and/or determine the type of liquid being sensed. For example, in an automotive environment, the sensor element 105 may be employed to measure the level of fuel in a fuel tank 106 (or a fuel reservoir), as well as determine what type of fuel is in the fuel tank 106. With reference to FIG. 1A, the sensor element 105 is described in more detail. The sensor element 105, in the exemplary embodiment, has two electrodes E1 and E2 which are extruded onto a substrate SBST, which is mounted on a shield plate SH2 that acts as a fixed reference plane. FIG. 1A shows a cross section AA of the extruded sensor element 105, which will become appreciated in the description that follows.

Figure 1B:
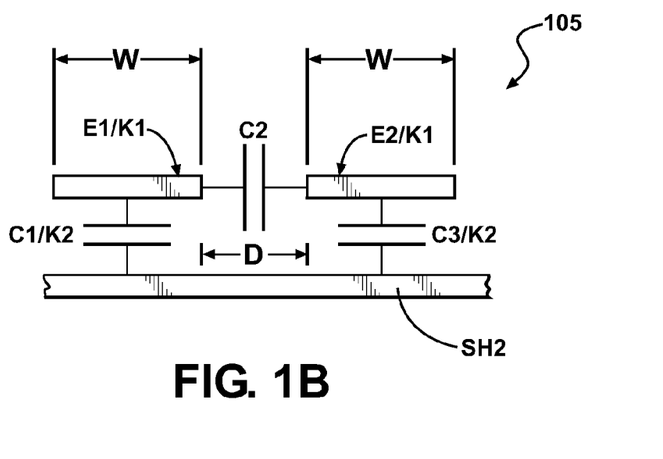
FIG. 1B shows a cross section of an exploded view of the sensor element in FIG. 1A.

FIG. 1B shows an exploded view of the sensor element in FIG. 1A. In the exploded view, two electrode plates E1, E2 are shown with a shield plate SH2. A capacitor C2 connects electrodes E1 and E2, while capacitors C1 and C3 connect electrodes E1 and E2 to the shield plate SH2, respectively, as readily understood in the art. The capacitance can be measured as a function of the dielectric constants K1, K2 and K3, the area of electrode plates E1 and E2 and the distance D between plates E1 and E2, which may be expressed as:

$$C2 = \frac{(pi \times ko \times kr)}{(\ln \times \{[4(w+d)]/w\}]}$$

where: ko is the dielectric of test fluid, kr is a substrate dielectric constant, pi is pi, w is the width of the trace and d is the distance between traces.

It is appreciated, however, that more than two electrode plates can be used to generate enough area for capacitance sensing to occur. In the embodiment illustrated, one plate E1 acts as a passive line (ground), while the other plate E2 acts as the active line (pulsed by a sine wave, not shown). The active plate will induce a sine wave on the passive plate depending on the dielectric constant (fuel or air). The plates (or multiple interlaced plates) are arranged in a side-by-side fashion. Encapsulation of the plates protects the plates from abrasion or damage, and increases the stiffness of the configuration.

Figure 2:
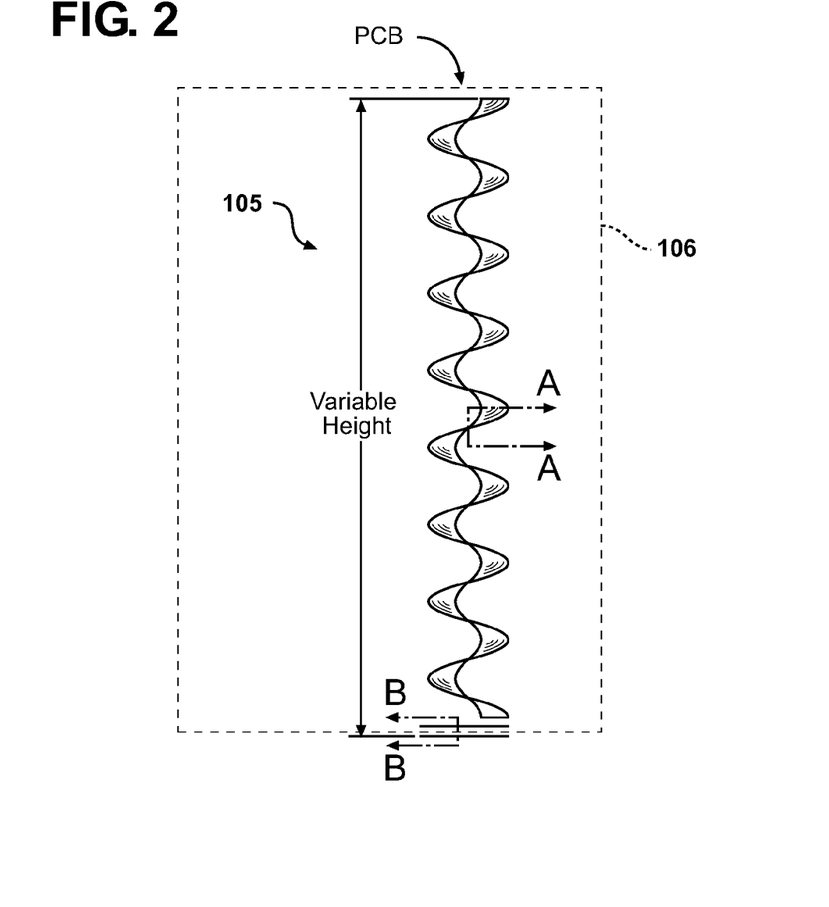
FIG. 2 shows a sensor element coil side view with variable height in accordance with the invention.

FIG. 2 shows a sensor element in one embodiment in accordance with the invention. The sensor element 105, in this embodiments a three-dimensional spiral or helical coil shape with variable height, as illustrated. It is understood, however, that the spiral or helical shape is exemplary and that a variety of different patterns or shapes could be used. The pattern and shape are used to generate enough surface area for increased capacitance sensing to be performed. The sensor element 105 can be attached mechanically to a fuel pump assembly mounted in a reservoir or vessel of a vehicle at top and bottom ends of the sensor element 105. Alternatively, the sensor element 105 could be mounted to a bracket as a stand alone device mounted inside the reservoir.

At the top of the illustrated sensor element 105, a circuit board (PCB) is mounted, a description of which is found below. While the PCB is mounted at the top of sensor element 105, the PCB could be mounted in any location of the vehicle and remote from the sensor element 105. Despite these devices being resistant to fuel absorption, it is inevitable that some absorption will occur over the course of time. To minimize the exposure to such absorption, the PCB should preferably be mounted such that it has minimal submersion in the fuel. Hence, it is preferable to mount it at the top of the sensor element 105 to prevent fuel absorption and to provide the circuitry and a proximate location to the sensor. At the bottom of the sensor element 105 is a calibrate/detect sensor element 107 which is used to determine the dielectric constant of the fuel inside the fuel tank, further described below with reference to FIG. 3.

The sensor element 105 detects the fuel level in a reservoir containing the fuel via a dielectric differential generated by air/fuel vapor versus liquid fuel. The sensor element 105, in this embodiment, is a spiral or helical coil comprised of a single or multiple interlaced electrode plates and a shield SH2, as shown in section AA in FIG. 1. Since the dielectric for fuel is very low, a large sensing plate area is preferable in order to make accurate measurements. In order to increase the surface area in this regard, a three dimensional sensor element coil design is used, which element may be compressed or extended to fit different designs and geometric configurations, for example to fit the size and shape of a fuel tank. This is advantageous since conventional sensor elements are not easily reconfigurable to fit multiple designs and configurations.

Figure 3:
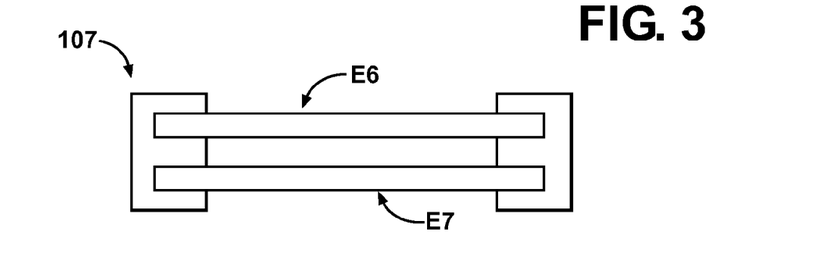
FIG. 3 shows a cross section of the sensor element coil of FIG. 2.

At the bottom of the sensor element 105 is a calibrate/detect sensor element 107 comprised of plates E6 and E7, as shown in FIG. 3. The calibrate/detect sensor element 107 determines the dielectric constant of the fuel inside the fuel tank. Although the calibrate/detect sensor 107 is configured in the illustrated embodiment at the bottom of the sensor element 105, it could be placed at a remote location. Alternatively, a pre-calibrated dielectric constant could be used in place of element 107.

FIG. 3 shows a cross section BB of the calibrate/detect sensor 107 and has an opening to receive fuel there-between. The dielectric value detected by the calibrate/detect sensor 107 is compared by the microcontroller (µC) 115 to a data-base of fuel dielectric constants that correspond with various fuel types. In this way, the microcontroller 115 can determine what type of fuel is in the fuel tank and/or whether the fuel may be contaminated. As a result of learning the fuel type, this information can be used by the vehicle's on board computer to adjust fuel/air mixtures in the combustion stage based on the fuel being used. For example, the fuel air mixture for flex fuels would be different from a high test fuel. This eliminates the need for more expensive sensing devices to be used elsewhere in the vehicle. Similarly, the calibrate/detect sensor 107 may be used for sensing water or contamination in the fuel tank since the dielectric values of such materials will be significantly different than that for fuels. The on board computer could then alert the driver of contamination in the vehicle fuel tank.

Figure 4:
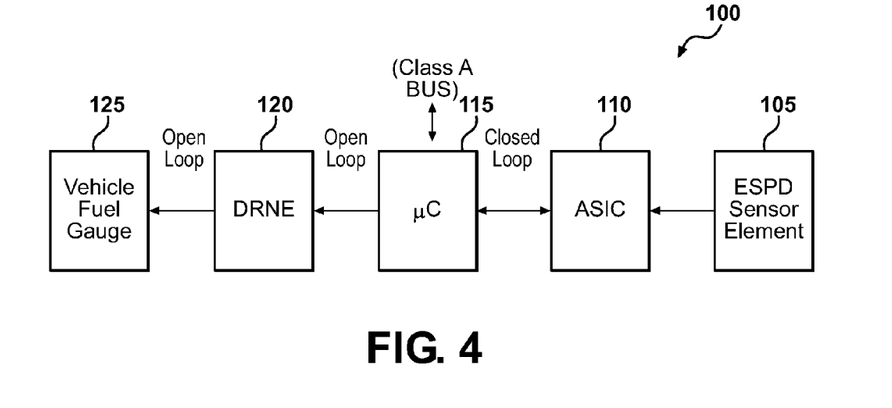
FIG. 4 shows a system configuration with the sensor element in accordance with the invention.

FIG. 4 shows an system configuration with the sensor element in accordance with the invention. The overall system 100 includes the sensor element 105, an ASIC 110, in this case an off-the-shelf Freescale™ ASIC MC33941 Electric Field Imaging Device, although it is understood that any compatible ASIC could be used, a micro-controller 115 such as those made by Microchip™, Freescale™ or Texas Instruments™, circuitry 120 to control the ground state which interfaces with the microcontroller, and the vehicle fuel gauge 125, as depicted in FIG. 4. In operation, the ASIC receives information detected from the sensor element 105 and converts the capacitance generated by the sensor to generate a proportional voltage output. The voltage output is sent to the micro-controller, which changes the output circuitry resistance level to correspond to the vehicle requirements, which are then displayed on the vehicle fuel gauge.

Figure 5:
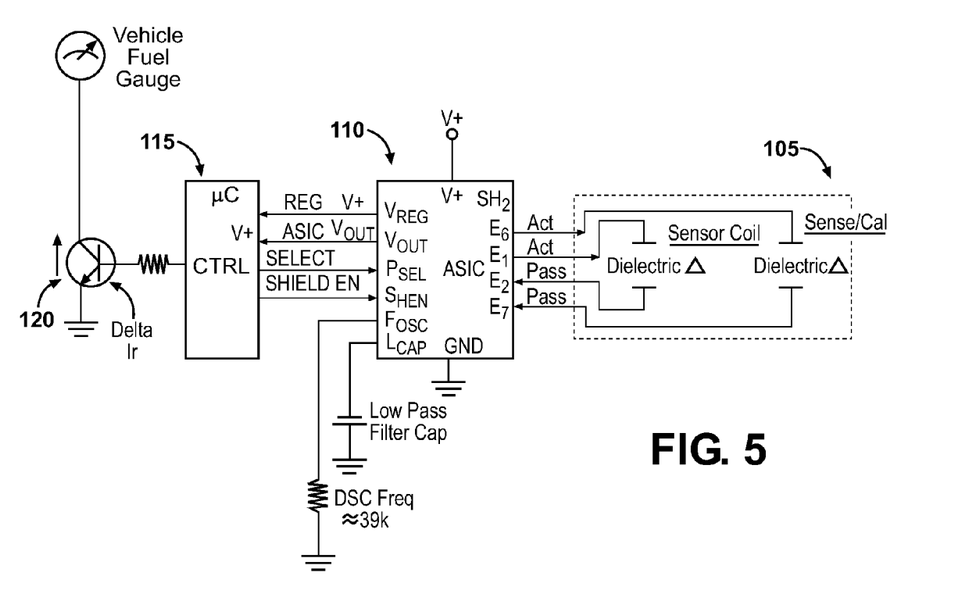
FIG. 5 shows an electrical schematic of the sensor element in accordance with the embodiment of FIG. 4.
Figure 6:
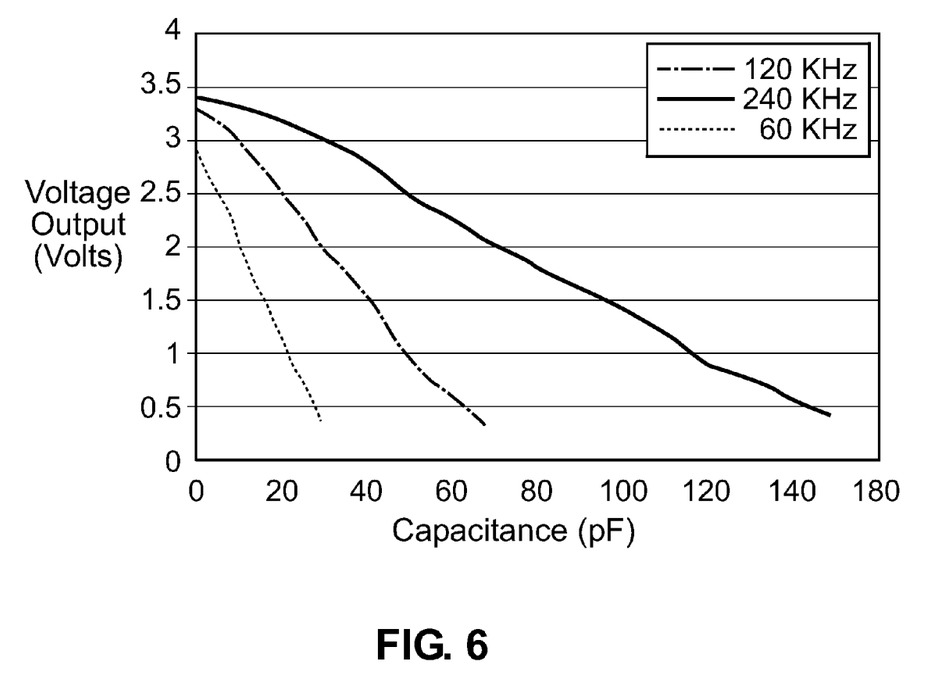
FIG. 6 illustrates an output of voltage and capacitance using three discrete frequencies, as known in the prior art.

FIG. 5 shows an schematic of the sensor element in accordance with the embodiment of FIG. 4. Unlike conventional fuel level sensors that require a variable resistor attached to a float located in the fuel tank, the invention has a solid state circuit that controls the resistance path to ground without any moving parts. The circuit that controls this resistance path is controlled by microcontroller 115. Microcontroller 115 receives an analog input from the output of a circuit, in this case ASIC 110, which produces a proportional output of voltage versus capacitance, as illustrated in FIG. 6. The ASIC 110 base frequency output to electrode E1 is selectable via a discrete resistor. The sensor element 105 is comprised of two elements or traces of calculated width and spacing. One trace (electrode E1) acts as a transmitter trace, while the second trace (electrode E2) acts as the receiver or detector, both of which are internally ground at the ASIC 110. In the exemplary operation, when the ASIC 110 generates a low radio frequency sine wave with a nominal 5.0 V peak-to-peak amplitude on the electrode E1, a comparable corresponding reduced wave is produced on the receiver electrode E2. The received wave is then amplified by the ASIC 110 and a corresponding proportional voltage analog output is sent to the microcontroller 115. The voltage induced on the electrode E2 is measured as an inverse function of the capacitance between the electrodes E1 and E2. Increasing the capacitance results in decreasing voltage output by the ASIC 110. Shield SH2 is included to minimize the electrode signal along connecting wires, and within the ASIC 110 a circuit provides a buffered version of the returned AC signal form the electrode E2. Since it has nearly the same amplitude and phase as the electrode signal, there is little to no potential difference between the two signals, thereby canceling out any electric field. In effect, the shield SH2 isolates the electrode signal from external noise. The shield SH2 can be connected to a coax cable used to connect the electrodes E1 and E2, and is also connected to the ground plane used behind the electrodes E1 and E2 to cancel out any noise that could attenuate the AC signal.

Figure 7A:
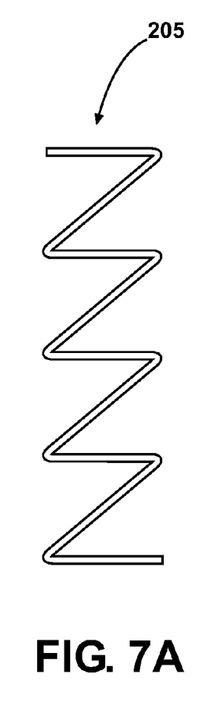
FIG. 7 illustrates an exemplary embodiment of the sensor element of the invention in a zig-zag shape.
Figure 7B:
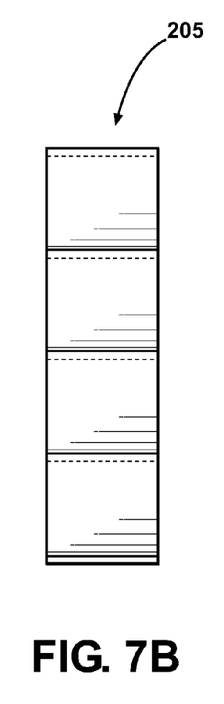
Figure 8:
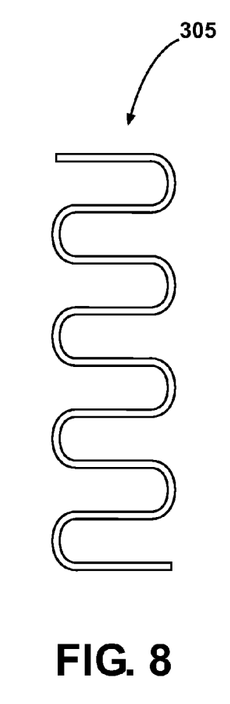
FIG. 8 illustrates an exemplary embodiment of the sensor element of the invention in a serpentine shape.

FIGS. 7A, 7b and 8 illustrate various alternate embodiments of the sensor element in accordance with this aspect of the invention. In FIGS. 7A and 7B, the sensor element 205 is extruded to create a zig-zag shape or pattern. In FIG. 8, the sensor element 305 is extruded to form a serpentine shape or pattern. It is readily understood that the invention is not limited to these examples, and that the sensor element may be extruded or otherwise shaped to form any suitable shape or pattern.

Obviously, many modifications and variations of the present invention are possible in light of the above teachings. It is, therefore, to be understood that within the scope of the appended claims, the invention may be practiced otherwise than as specifically described.

What is claimed is:

1. A capacitive sensor element, comprising:
   a pair of electrically conductive plates extending longitudinally between opposite ends and positioned in laterally spaced relationship with respect to one another each other and attached to a dielectric material;
   a substrate of a less electrically conductive material encapsulating said pair of plates to isolate them from one another and from their external environment, and wherein said substrate is of a spring-like material which is expandable and contractible in order to vary a height of said capacitive sensor element.

2. The capacitive sensor element of claim 1,
   further including to an application-specific integrated circuit (ASIC) in electrical communication with said pair of plates for receiving a signal corresponding to a fluid level and for converting said signal to a voltage, and further including a microcontroller in electrical communication with said ASIC for receiving said voltage and for changing a resistance level of output circuitry and displays results on a display.

3. The capacitive sensor element of claim 2, wherein the fluid is fuel for a vehicle, and said capacitive sensor is adaptable to expand and contract into varying shapes and sizes of a fuel tank which holds the fuel.

4. The capacitive sensor element of claim 1 wherein said electrically conductive plates are co-extensive with one another.

5. The capacitive sensor element of claim 4 wherein said encapsulated plates extend through a helical path between said opposite ends.

6. The capacitive sensor element of claim 5 wherein said helical path is in the form of a twisting of said encapsulating plates along their longitudinal axis.

7. A method of measuring fluid in a reservoir using a capacitive sensor element, comprising:
   positioning a pair of electrically conductive plates extending longitudinally between opposite ends in spaced relationship with respect to one another other and attached to a dielectric material;
   encapsulating the pair of plates in a substrate of a less electrically conductive material to isolate the plates from one another and from their external environment, and wherein the substrate is of a spring-like material which is expandable and contractible in order to vary a height of the capacitive sensor element; and
   disposing the sensor element in a reservoir and measuring the fluid.

8. The method of claim 7, further comprising the steps of:
   outputting a signal from the pair of plates to an application-specific integrated circuit (ASIC), converting the signal to a voltage,
outputting the voltage to a microcontroller,
changing a resistance level of output circuitry, and
displaying results on a display.

9. The method of claim 7, wherein the fluid is fuel for a vehicle, and the capacitive sensor is adaptable to expand and contract into varying shapes and sizes of a fuel tank which holds the fuel.

10. The method of claim 7 wherein the plates are coextensive with one another.

11. The method of claim 10 further including the step of twisting the encapsulated plates into a helical path along their lengths.

12. The method of claim 11 wherein said step of twisting the encapsulated plates is further defined as twisting the encapsulated plates along their longitudinal axis.

* * * * *